United States Patent
Kozarekar

(10) Patent No.: US 7,797,089 B2
(45) Date of Patent: Sep. 14, 2010

(54) SYSTEM AND METHOD FOR MANAGING A POWER SOURCE IN A VEHICLE

(75) Inventor: Shailesh Kozarekar, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 727 days.

(21) Appl. No.: 11/278,028

(22) Filed: Mar. 30, 2006

(65) Prior Publication Data
US 2007/0233334 A1    Oct. 4, 2007

(51) Int. Cl.
*G05D 3/00* (2006.01)

(52) U.S. Cl. .............. 701/22; 701/51; 701/54; 701/55; 701/56; 180/65.265; 180/65.6; 180/65.7; 180/65.25; 180/65.29

(58) Field of Classification Search ............ 701/22; 320/103, 116, 132; 180/65.2
See application file for complete search history.

(56) References Cited

U.S. PATENT DOCUMENTS

| | | | |
|---|---|---|---|
| 5,569,999 A | 10/1996 | Boll et al. | |
| 5,869,950 A * | 2/1999 | Hoffman et al. | 320/103 |
| 5,934,395 A * | 8/1999 | Koide et al. | 180/65.2 |
| 5,945,808 A | 8/1999 | Kikuchi et al. | |
| 6,522,959 B1 | 2/2003 | Sawamura et al. | |
| 6,677,860 B2 * | 1/2004 | DelRossi et al. | 340/636.1 |
| 6,809,428 B1 | 10/2004 | Blackburn et al. | |
| 7,200,476 B2 * | 4/2007 | Cawthorne et al. | 701/51 |
| 2001/0042648 A1 * | 11/2001 | Wakashiro et al. | 180/65.2 |
| 2003/0088343 A1 | 5/2003 | Ochiai et al. | |
| 2003/0169001 A1 | 9/2003 | Murakami et al. | |
| 2003/0186116 A1 * | 10/2003 | Tanjou | 429/101 |
| 2005/0061563 A1 * | 3/2005 | Syed et al. | 180/65.2 |
| 2006/0001399 A1 * | 1/2006 | Salasoo et al. | 320/104 |
| 2006/0108971 A1 * | 5/2006 | Ono | 320/104 |
| 2006/0137921 A1 * | 6/2006 | Colvin et al. | 180/65.2 |

* cited by examiner

*Primary Examiner*—Tuan C To
*Assistant Examiner*—Redhwan Mawari
(74) *Attorney, Agent, or Firm*—David B. Kelley; Brooks Kushman P.C.

(57) ABSTRACT

A system and method for managing a power source in a vehicle having an engine and an electric machine includes setting first and second discharge limits for the power source, where the second discharge limit is higher than the first discharge limit. A buffer value is determined as a function of at least the second discharge limit and an engine-on power requirement. A driver demand for power is determined, and the engine is started when the engine is off and the driver demand for power exceeds the buffer value.

14 Claims, 3 Drawing Sheets

SYSTEM AND METHOD FOR MANAGING A POWER SOURCE IN A VEHICLE

BACKGROUND OF THE INVENTION

1. Field of the Invention

The present invention relates to a system and method for managing a power source in a vehicle.

2. Background Art

With the ever increasing need to produce vehicles that are more fuel efficient, hybrid electric vehicles (HEV's) have provided an improvement in fuel economy over many conventional vehicles that utilize only an internal combustion engine to drive the vehicle. One of the primary advantages of an HEV is that it allows the vehicle to be powered by an electric motor under certain operating conditions. For example, if the speed of the vehicle is relatively moderate, and the battery or other electrical power source is sufficiently charged, the engine may be shut off, and the vehicle powered exclusively by one or more electric motors. As operating conditions change, the engine may be started to provide additional power, and if needed, charge the battery.

An electrical power source, such as a battery, may be charged and discharged many times over the span of its useful life. Although in theory it may be possible to charge the battery to 100% of its capacity, and discharge the battery until there is zero charge remaining, in practice, it may be beneficial to limit the amount by which the battery can be charged and discharged. For any given power source, such as a battery, the charge and discharge limits may change according to operating conditions. For example, the ability of a battery to accept a charge, or to be discharged, may be dependent on a number of factors, such as the temperature of the battery and the battery state-of-charge (SOC). Moreover, if the battery is made up of a number of individual cells, the voltage of the cells may be another factor that affects the ability of the battery to accept a charge or to be discharged. Therefore, the charge and discharge limits placed on a battery may change as a function of, for example, the battery temperature. Specifically, at relatively low and relatively high battery temperatures, it may be desirable to reduce the charge and discharge limits to reflect the battery's reduced capacity at these temperatures.

In the case of an HEV, which may be powered by an electric motor, an engine, or some combination of the two, a reduced battery discharge limit means that operation of the motor will be limited, and a greater reliance on the engine will be necessary. Of course, increased use of the engine increases the use of fuel, thereby reducing the benefit otherwise obtained by operating an HEV. Thus, at relatively low or relatively high battery temperatures, the battery discharge limit may be met or exceeded with very little output from the motor. When the discharge limit is approached, the engine is started, and use of the motor is prohibited or reduced. This helps to keep the battery temperature under control, and further, helps to keep the battery from being damaged by over discharge.

Setting a discharge limit for a battery in an HEV, and appropriately controlling the electrical loads, including the motor, when the discharge limit is approached, can help increase battery life, by ensuring that the battery does not overheat or over discharge. One problem with this approach is that conventional discharge limits are set without considering very short term, transient outputs of the motor. For example, using a motor in an HEV to start the engine may require approximately 0.5 seconds of motor use. A conventional discharge limit for a battery may be set based on continuous use of a motor for two or more seconds. Thus, a conventional battery discharge limit may be set lower than necessary for purposes of starting an engine. In such a case, the engine may be started sooner than is required, thereby unnecessarily using fuel. In addition, use of a conventional battery discharge limit may cause an engine to remain on in an HEV, when it might otherwise be able to be shut off, thereby increasing fuel economy.

Therefore, a need exists for a system and method for managing a power source in a vehicle that sets a discharge limit for the power source at a level that facilitates reduced use of an internal combustion engine, thereby increasing overall fuel economy, while still protecting the battery from overheating and over discharging.

SUMMARY OF THE INVENTION

Accordingly, the present invention provides a method for managing a power source in a vehicle in which two discharge limits are set for the power source, the higher of the two discharge limits being used for an engine on/off strategy.

The invention also provides a system for managing a power source in a vehicle that includes a temperature sensor and a control system in communication with the sensor, wherein the control system is programmed with two discharge limits for the power source, and is configured to control operation of the engine at least in part based on the higher of the two discharge limits.

The invention further provides a method for managing a power source in a vehicle including an engine and an electric machine. Each of the engine and the electric machine is operable to output torque to at least one vehicle wheel. The engine has an engine-on power requirement for starting the engine, and the power source is operable to supply power to the electric machine. The method includes setting a first discharge limit for the power source as a function of at least one condition of the power source. A second discharge limit for the power source is set, and is higher than the first discharge limit. A buffer value is determined as a function of at least the second discharge limit and the engine-on power requirement. A driver demand for power is determined, and the engine is started when the engine is off and the driver demand for power exceeds the buffer value.

The invention also provides a method for managing a power source in a vehicle, where the power source includes a battery operable to supply power to an electric machine capable of providing torque to at least one vehicle wheel. The method includes setting a first discharge limit for the battery as a function of at least one battery condition, including a temperature of the battery. The method also includes setting a second discharge limit for the battery as a function of at least one battery condition, including the temperature of the battery. The second discharge limit is higher than the first discharge limit, and is at least partly based on the engine-on power requirement. A temperature of the battery is determined, and the engine is started when the engine is off and the driver demand for power exceeds a respective buffer value for the determined battery temperature.

The invention further provides a system for managing a power source in a vehicle including an engine, an electric machine, and an accelerator pedal for indicating a driver demand for power. The system includes a sensor for measuring a temperature related to the temperature of the power source, and a control system in communication with the sensor and the accelerator pedal. The control system includes at least one controller, and is programmed with first and second discharge limits for the power source. The first discharge limit is a function of at least one condition of the power source, and the second discharge limit is higher than the first discharge limit. The control system is further programmed with a power buffer, the power buffer being a function of at least the second discharge limit and the engine-on power requirement. The control system is configured to determine a temperature of the power source at least partly based on input from the sensor. It also determines a buffer value from the power buffer for the determined temperature of the power source. A driver demand for power is determined, and the engine is started when the engine is off and the driver demand for power exceeds the buffer value.

DETAILED DESCRIPTION OF THE PREFERRED EMBODIMENT(S)

Figure 1:
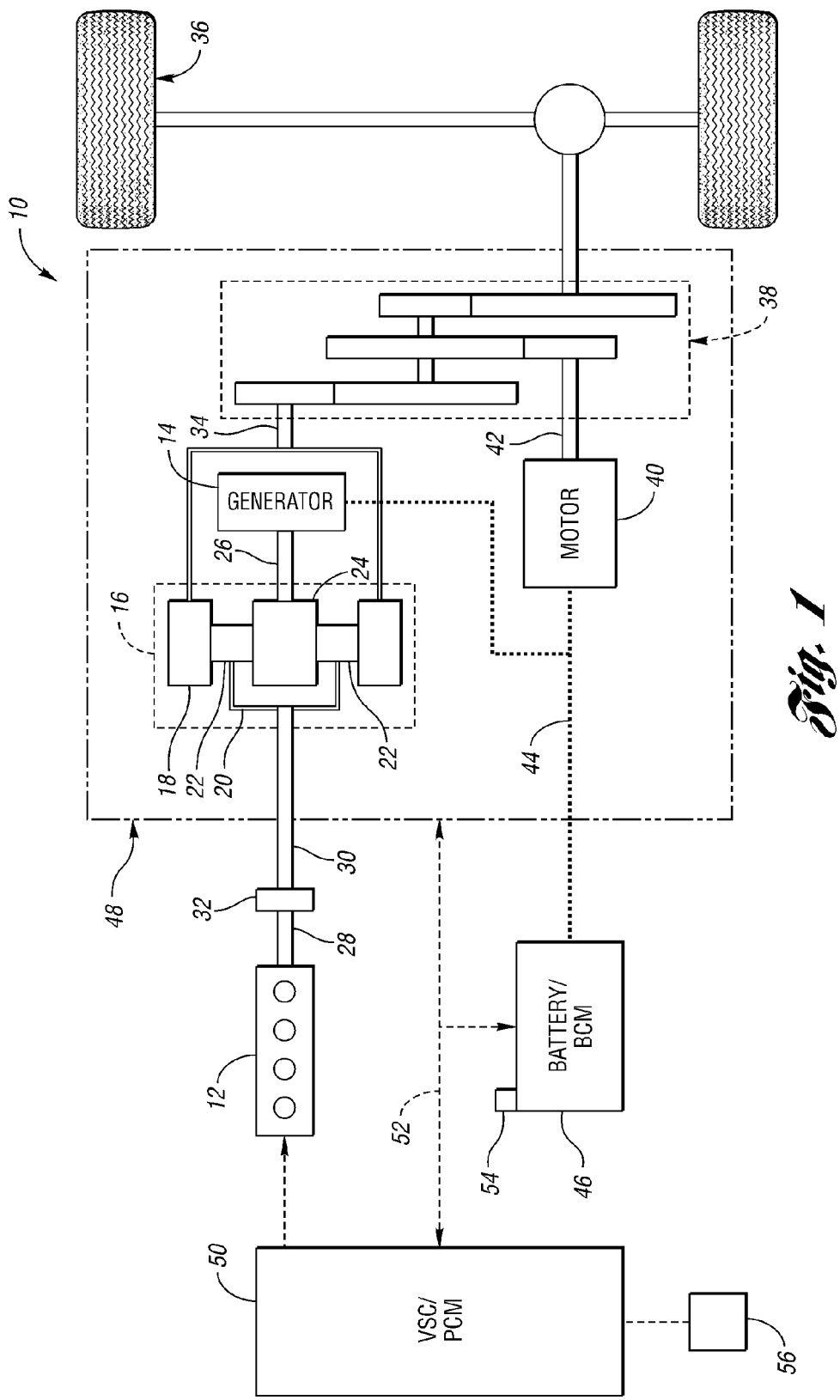
FIG. 1 shows a schematic representation of a hybrid electric vehicle including a system for managing a power source in accordance with one embodiment of the present invention.

FIG. 1 shows a schematic representation of a vehicle 10 including an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear set 16. Having the generator 14 operatively connected to the engine 12, as shown in FIG. 1, allows the speed of the engine 12 to be controlled by the generator 14.

The ring gear 18 is connected to a shaft 34, which is connected to a first set of vehicle drive wheels, or primary drive wheels 36, through a second gear set 38. The vehicle 10 includes a second electric machine, or motor 40, which can be used to output torque to a shaft 42. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an electrical power source, or battery 46.

The battery 46 is a high voltage battery that is capable of outputting electrical power to operate the motor 40 and the generator 14. As shown in FIG. 1, the battery 46 includes its own controller, or battery control module (BCM). Other types of power sources and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transmission 48. To control the engine 12 and components of the transmission 48—i.e., the generator 14 and motor 40—a control system, shown generally as controller 50, is provided. As shown in FIG. 1, the controller 50 is a vehicle system controller/powertrain control module (VSC/PCM). Although it is shown as a single controller, it may include multiple controllers. For example, the PCM portion of the VSC/PCM 50 may be software embedded within the VSC/PCM 50, or it can be a separate hardware device.

A controller area network (CAN) 52 allows the VSC/PCM 50 to communicate with the transmission 48 and the BCM of the battery 46. Just as the battery 46 includes a BCM, other devices controlled by the VSC/PCM 50 may have their own controllers. For example, an engine control unit (ECU) may communicate with the VSC/PCM 50 and may perform control functions on the engine 12. In addition, the transmission 48 may include one or more controllers, such as a transmission control module (TCM), configured to control specific components within the transmission 48, such as the generator 14 and/or the motor 40. Some or all of these various controllers can make up a control system contemplated by the present invention.

Also shown in FIG. 1 is a temperature sensor 54 attached to the battery 46. The sensor 54 communicates a temperature of the battery to the BCM, which in turn, communicates with the VSC/PCM 50. As described more fully below, the sensor 54 determines the temperature of the battery 46, so that desired control of the motor 40 and/or the generator 14 can be implemented. Although the embodiment shown in FIG. 1 uses a temperature sensor to directly measure the temperature of the battery 46, for purposes of the present invention, the VSC/PCM 50 could determine a temperature related to the battery 46 through other information, such as the temperature of a battery compartment, or some combination of measured temperatures or conditions from which a temperature related to the temperature of the battery 46 could be inferred. Also shown in FIG. 1 is an accelerator pedal 56 which communicates to the VSC/PCM 50 a driver demand for power, based on its position.

The present invention includes a system for managing a power source in a vehicle, such as the battery 46 in the vehicle 10, shown in FIG. 1. In one embodiment, the system includes the sensor 54 and the VSC/PCM 50. The VSC/PCM 50 can be preprogrammed with discharge limits for the battery 46. These discharge limits can be a function of various battery conditions, such as the battery temperature, the SOC, the voltage of the various cells which make up the battery 46, or some combination of these different conditions. Moreover, other conditions may be included in the function that defines the discharge limits for the battery 46. Although some or all of these various conditions may be read directly by the VSC/PCM 50, in the embodiment shown in FIG. 1, it is contemplated that the temperature of the battery 46 will be determined by the sensor 54, which communicates directly with the BCM. The BCM communicates this temperature, and other battery conditions, to the VSC/PCM via the CAN 52.

As discussed above, an HEV will generally shut down its engine when it is not needed, in order to improve fuel economy. In the vehicle 10 shown in FIG. 1, the VSC/PCM 50 is programmed with the control strategy for controlling the engine 12 and other components of the vehicle 10. The strategy depends, in part, on driving conditions. For example, if the position of the accelerator pedal 56 indicates a low driver demand for power, the vehicle 10 may be driven exclusively by one or more of the electric machines—i.e., the motor 40 and the generator 14. Conversely, if the driver demands a high level of power, both the engine 12 and one or both of the motor 40 and the generator 14 can be used to drive the vehicle 10.

Where there is a transient demand for power—e.g., intermittent periods of driving and coasting—the engine 12 and/or motor 40 and generator 14 may be used separately, or in combination, as needed. Finally, when braking is demanded—e.g., during coasting or during a brake pedal request—the vehicle kinetic energy is recovered to the battery 46 via regenerative braking. Depending on the operating state of the battery 46, one or more of these desired operating modes may need to be altered. As explained below, the present invention provides a system and method for taking into account the battery conditions, without undue sacrifice of the fuel economy.

Figure 2:
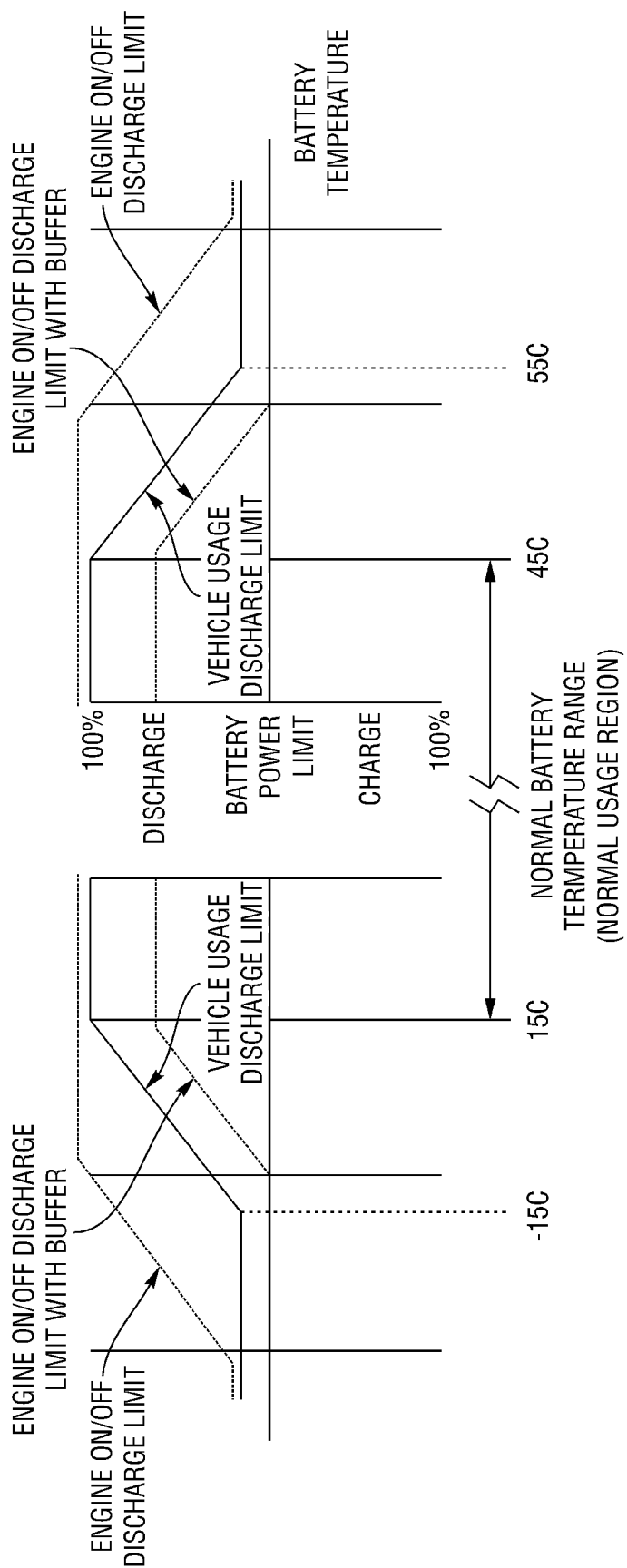
FIG. 2 illustrates various discharge limits changing as a function of battery temperatures.

FIG. 2 shows a graph of discharge limits for the battery 46, which can be programmed into the VSC/PCM 50, the BCM, or some other controller or controllers, where they will be accessible to the VSC/PCM 50. On the right side of the graph shown in FIG. 2 are two discharge limits: a Vehicle Usage Discharge Limit and an Engine On/Off Discharge Limit, each of which are functions of at least the battery temperature. The left side of the graph in FIG. 2 also shows the two discharge limits, over a much lower temperature range then shown on the right side of the graph. The middle portion of the graph illustrates a first predetermined temperature range, or a "normal battery temperature range" for the battery 46. In the embodiment shown in FIG. 2, this temperature range is from 15 C to 45 C. These values are used for illustrative purposes only, and the actual "normal" battery temperature range for any particular battery may be different.

As shown in FIG. 2, the Vehicle Usage Discharge Limit is relatively constant over the normal battery temperature range. Over this range, the battery 46 can be discharged for much longer periods of time—e.g., 10-20 seconds—without encountering the discharge limit. Conversely, over a second predetermined temperature range, which in the embodiment shown in FIG. 2 is 45 C to 55 C, the Vehicle Usage Discharge Limit decreases sharply. The same is true over a third predetermined temperature range, 15 C to −15 C. Above the 55 C and below −15 C, the Vehicle Usage Discharge Limit is again relatively constant, but it is very low. Thus, FIG. 2 clearly illustrates that at relatively high and relatively low temperatures, the ability of an HEV, such as the vehicle 10, to use its electric machines to operate the vehicle can be limited because of the limited functionality of the battery at these more extreme temperatures.

In particular, if a load such as the generator 14 or the motor 40 is allowed to discharge the battery 46 beyond the Vehicle Usage Discharge Limit, the battery 46 could overheat, or be over discharged. Thus, use of electric machines, such as the generator 14 and the motor 40, is generally limited when the battery 46 is at a very high or very low temperature. A control strategy may be programmed into, for example, the VSC/PCM 50 to automatically inhibit use of the generator 14 and the motor 40 when the Vehicle Usage Discharge Limit is exceeded.

The Vehicle Usage Discharge Limit shown in FIG. 2 may be indicative of a conventional discharge limit provided for a power source, such as the battery 46 shown in FIG. 1. The present invention, however, goes beyond the use of a single discharge limit, and also includes a second discharge limit, labeled in FIG. 2 as "Engine On/Off Discharge Limit." As shown in FIG. 2, the Engine On/Off Discharge Limit is higher than the Vehicle Usage Discharge Limit over the entire temperature range shown in FIG. 2. This does not need to be the case, so that in some embodiments, the Engine On/Off Discharge Limit may be greater than the Vehicle Usage Discharge Limit only over a certain temperature range. In fact, even in FIG. 2, the difference between the two discharge limits is very little over the normal battery temperature range, but is much greater over the relatively high and relatively low temperature ranges where the Vehicle Usage Discharge Limit is sharply reduced.

Also shown in FIG. 2 is a "Engine On/Off Discharge Limit with Buffer." This buffer is determined based on an engine-on power requirement. Specifically, in the embodiment shown in FIG. 1, the generator 14 is used to spin the engine 12 during engine startup. The amount of power the generator 14 uses to start the engine 12 can be considered the engine-on power requirement. If, for example, the generator 14 uses 10 kilowatts (kW) to start the engine 12, the engine-on power requirement would be 10 kW. Therefore, the Engine On/Off Discharge Limit with Buffer, which may be conveniently called a "power buffer," will be set such that it is always at least 10 kW lower than the Engine On/Off Discharge Limit.

When the engine is off and the driver demand for power exceeds the value of the power buffer, the VSC/PCM 50 will cause the engine 12 to be started. This may briefly cause the discharge level to exceed the Vehicle Usage Discharge Limit, but this discharge will occur only briefly, and once the engine 12 is started, operation of the generator 14 and motor 40 can be reduced or completely prohibited so that the battery 46 maintains its temperature and is not over discharged. In the embodiment illustrated in FIGS. 1 and 2, the Vehicle Usage Discharge Limit is based on a continuous discharge of the battery 46 for some predetermined amount of time—e.g., two seconds. In contrast, the Engine On/Off Discharge Limit is higher because it is based on a much shorter duration of battery discharge—e.g., 0.5 seconds. Thus, the present invention allows the battery 46 to be discharged at a higher level if the discharge is very brief. This allows the engine 12 to remain off for longer periods and to be shut off more frequently than conventional battery management systems.

If a control strategy used only one discharge limit, such as the Vehicle Usage Discharge Limit, the values of the power buffer would be reduced, thereby causing the engine to be started sooner than is necessary. Similarly, if the engine 12 is operating, and a driver demand for power is below the power buffer for a given battery temperature, the engine 12 can be shut down, since there will be power available to restart it. The higher power buffer of the present invention allows the engine 12 to be shut down more frequently than it could be if a single discharge limit, and thus a lower power buffer, were used. Any time that the engine 12 is operating, and the driver demand for power exceeds the power buffer, engine shutdown will be inhibited.

Another way in which the present invention manages a power source, such as the battery 46, is by reducing the torque output of either or both of the generator 14 and the motor 40 over the battery temperature ranges where the Vehicle Usage Discharge Limit is reduced. In the embodiment shown in FIG. 2, these ranges are 45 C to 55 C on the high end, and 15 C to −15 C on the low end. As noted above, the VSC/PCM 50 receives a driver demand for power as indicated by a position of the accelerator pedal 56.

Figure 3:
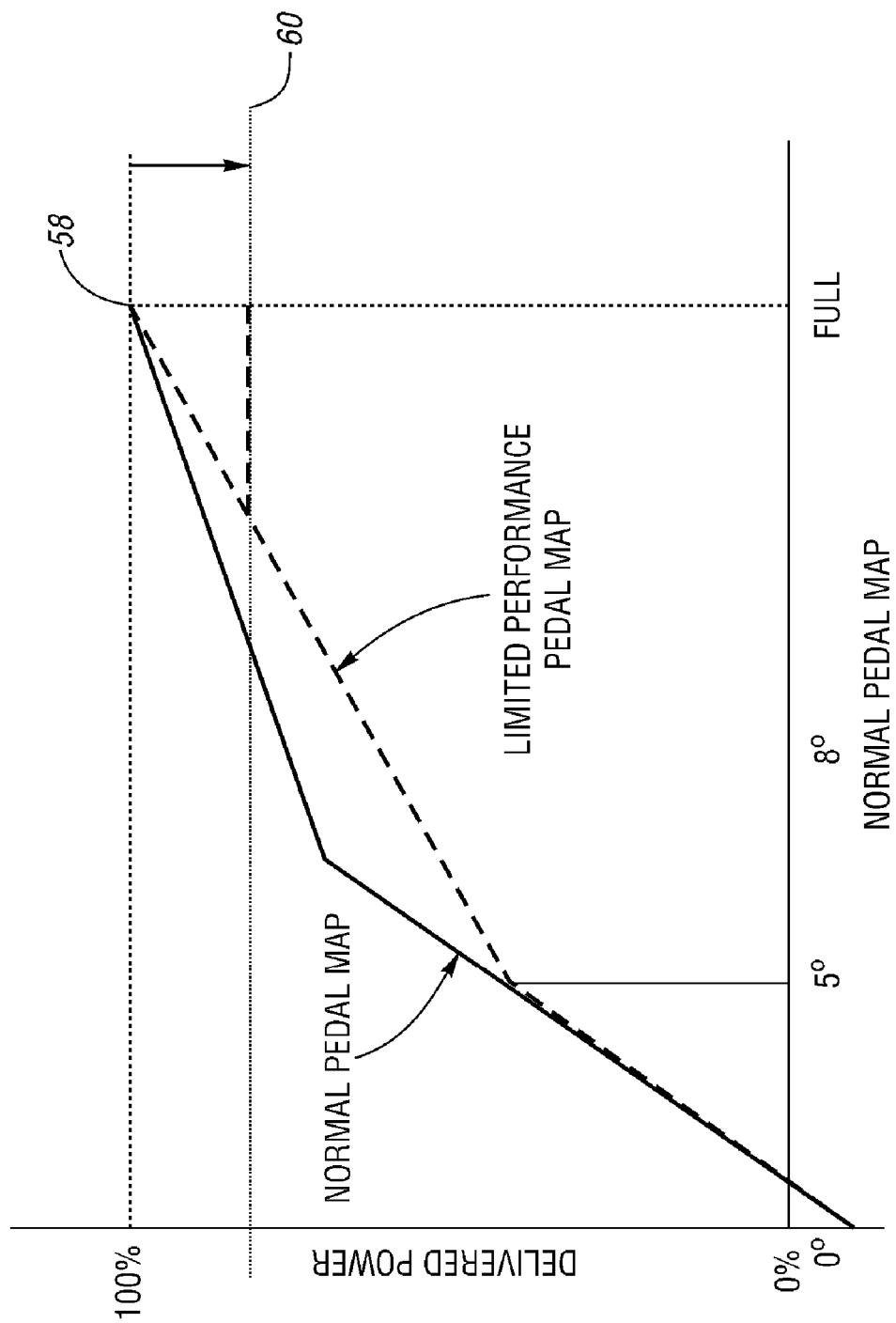
FIG. 3 shows a graph of power delivered to a vehicle versus the position of an accelerator pedal, and illustrates both a normal pedal map and a limited-performance pedal map for various pedal positions.

In order to reduce the output of the electric machines 14, 40, the VSC/PCM 50 can be programmed to provide a reduced torque output command to the electric machines 14, 40 when the temperature of the battery 46 is within one of the predetermined temperature ranges. FIG. 3 shows a graph of the amount of power delivered to the vehicle 10 by the electric machines 14, 40 for a normal pedal map, and a limited-performance pedal map. Limiting the performance of the electric machines 14, 40, in accordance with the present invention, provides another way by which the battery 46 can be kept from overheating, while still allowing the engine 12 to remain shutdown.

In the graph shown in FIG. 3, the normal pedal map graphically illustrates the delivered power versus pedal position for various positions of the accelerator pedal 56. The limited-performance pedal map modifies the delivered power by using a battery temperature modifier. In the embodiment shown in FIG. 3, the battery temperature modifier is equal to 1 if the accelerator pedal position is between 0 and 5 degrees. This means that when the driver depresses the accelerator pedal 56 only a small amount—i.e., demands only a small amount of power—the normal pedal map and a limited performance pedal map are coincident.

Beyond five degrees, however, the battery temperature modifier reduces the normal pedal map such that the VSC/PCM 50 will reduce its request to the electric machines 14, 40 so they draw less power from the battery 46, which helps to maintain the temperature of the battery 46. The battery temperature modifier can be any modifier effective to reduce the normal pedal map so that the power requested from the electric machines 14, 40 is reduced. Thus, the battery temperature modifier can be a constant value, or a function of the batter temperature and pedal position, as shown in FIG. 3. FIG. 3 also illustrates that in some situations, the limited-performance pedal map may be allowed to intersect with the normal pedal map at a fully open pedal position to deliver at 100% of the power requested by the driver. This is illustrated at point 58 in FIG. 3. Conversely, the limited-performance pedal map may be limited to some value, indicated by line 60 in FIG. 3, such that it does not allow 100% of the delivered power even when the accelerator pedal 56 is fully open.

Because the driving habits of different drivers may cause a disparity between how much of the time an engine is used and how much of the time a motor is used in an HEV, the useful life of a battery may vary widely among vehicles, even when the vehicles are the same age. For this reason, the present invention also contemplates application of a battery usage factor to account for some of these different driving habits. For example, if a vehicle is generally low mileage, or if the vehicle is used primarily at high speeds on a highway, the motor or motors may be used infrequently, and the battery supplying them power may have a longer remaining life span than indicated by its calendar age. In such cases, it may be possible to increase the discharge limits to further increase fuel economy.

Two different ways of calculating a usage factor are now described. In the first, a calendar age estimate (CAE) is calculated. Although this value may be calculated according to different formulas, one such formula calculates the CAE as follows:

$$\text{CAE} = (\text{Total Life Estimate} * \text{Calendar Time}) / (\text{Current Life Estimate} * \text{Vehicle Life Expectation}).$$

In this formula, the Total Life Estimate and the Current Life Estimate are estimated according to a predetermined criteria, such as amp-hours throughput, or by a cumulative stress function, both of which are techniques known to those in the art. The Calendar Time represents the age of the battery, and the Vehicle Life Expectation, for purposes of this formula, can be set to some high value greater than the actual program life expectation—e.g., 18 years or 200,000 miles, depending on the units being used.

As described below, the CAE can then be used to create a usage factor applied to the discharge limits. Another way to calculate a usage factor is by first calculating a Mileage Age Estimate (MAE) as follows:

$$\text{MAE} = (\text{Total Life Estimate} * \text{Current Mileage}) / (\text{Current Life Estimate} * \text{Vehicle Life Expectation}).$$

In this formula, the Current Mileage of the vehicle replaces the variable "Calendar Time" in the first formula, with the remaining variables being the same as in the CAE calculation. The MAE provides an alternative to the CAE for deciding when to increase the discharge limits.

By way of example, if a CAE value is calculated, and that value is less than one, it indicates that the usage of the battery in the vehicle is not low enough to warrant increasing the discharge limits. Conversely, if it is greater than one, the CAE can be used to determine a usage factor using the following formula:

$$\text{Usage Factor} = (1/\text{CAE}) * (\text{Max Allowed Battery Temperature} - \text{Normal Set Point}).$$

In this formula, the Max Allowed Battery Temperature may be determined empirically, or may be a value provided, for example, by the battery manufacturer. The Normal Set Point is the value of the discharge limit at the battery temperature being examined. Although it is called a "factor" the calculated usage factor is not multiplied by the original discharge limit, but rather, it is added to it. Of course, different types of usage factors could be calculated, and used to increase the discharge limits by multiplying the original discharge limits by the usage factor.

The usage factor can be calculated for any number of points along the discharge curve, thereby generating an entirely new discharge curve based on battery usage. As noted above, the MAE can be used in place of the CAE to determine a usage factor based on mileage, rather than calendar age. Increasing the discharge limits according to this method, allows the engine to be shut off and kept off more frequently, thereby further increasing the fuel economy of the vehicle.

While the best mode for carrying out the invention has been described in detail, those familiar with the art to which this invention relates will recognize various alternative designs and embodiments for practicing the invention as defined by the following claims.

What is claimed:

1. A method for managing a power source in a vehicle including an engine and an electric machine, each of the engine and the electric machine being operable to output torque to at least one vehicle wheel, the engine having an engine-on power requirement for starting the engine, the power source being operable to supply power to the electric machine and having a first operating temperature range, a second operating temperature range above the first operating temperature range, and a third operating temperature range below the first operating temperature range, the method comprising:

setting a first discharge limit for the power source that is substantially constant over the first operating temperature range and decreasing over the second and third operating temperature ranges, the first discharge limit being at least partly based on an amount of power that is supplied by the power source for a first predetermined period of time;

setting a second discharge limit for the power source higher than the first discharge limit the second discharge limit being at least partly based on the temperature of the power source and an amount of power that is supplied by the power source for a second predetermined amount of time that is less than the first predetermined amount of time, and which is based on an amount of time required to start the engine;

determining a buffer value as a function of at least the second discharge limit and the engine-on power requirement;

determining a driver demand for power; and starting the engine when the engine is off and the driver demand for power exceeds the buffer value.

2. The method of claim 1, further comprising inhibiting engine shutdown when the engine is on and the driver demand for power exceeds the buffer value.

3. The method of claim 1, wherein the first discharge limit decreases as a temperature of the power source increases over a predetermined temperature range, the method further comprising limiting torque output of the electric machine when at least one predetermined condition is met, including the driver demand for power being less than the first discharge limit and the temperature of the power source being within the predetermined temperature range.

4. The method of claim 3, the vehicle further including an accelerator pedal, wherein the at least one predetermined condition includes the accelerator pedal being depressed by at least a predetermined amount.

5. The method of claim 1, further comprising allowing the engine to be shut down when the driver demand for power is less than the buffer value.

6. The method of claim 1, wherein the at least one condition of the power source includes a usage factor, the usage factor being applied to increase the first and second discharge limits over a respective temperature range of the power source.

7. The method of claim 1, further comprising inhibiting use of the electric machine when the driver demand for power exceeds the second discharge limit.

8. A method for managing a power source in a vehicle including an engine and an electric machine, the engine being operable to output torque to at least one vehicle wheel and having an engine-on power requirement for starting the engine, the electric machine being operable to output torque to at least one vehicle wheel, and further operable to provide torque to start the engine, the power source being operable to supply power to the electric machine and having a first operating temperature range, a second operating temperature range above the first operating temperature range, and a third operating temperature range below the first operating temperature range, the method comprising:

setting a first discharge limit for the power source as a function of at least one power source condition, including a temperature of the power source and at least partly based on an amount of power than is supplied by the power source for a first predetermined period of time, the first discharge limit being substantially constant over the first operating temperature range and decreasing over the second and third operating temperature ranges;

setting a second discharge limit for the power source as a function of at least one power source condition, including the temperature of the power source, the second discharge limit being higher than the first discharge limit and at least partly based on the engine-on power requirement, and an amount of power that is supplied by the power source for a second predetermined amount of time that is less than the first predetermined amount of time, and which is based on an amount of time required to start the engine;

determining a buffer value as a function of at least the second discharge limit and the engine-on power requirement;

determining a driver demand for power;

determining a temperature of the power source; and starting the engine when the engine is off and the driver demand for power exceeds a respective buffer value for the determined power source temperature.

9. The method of claim 8, further comprising limiting the torque output of the electric machine when certain conditions are met, including the driver demand being less than the first discharge limit and the determined temperature of the power source being within the second or third operating temperature range.

10. The method of claim 9, the vehicle further including an accelerator pedal operable by the driver to indicate the driver power demand, wherein the certain conditions further include the accelerator pedal being depressed by at least a predetermined amount.

11. The method of claim 10, wherein the torque output of the electric machine is limited according to a function of at least the determined temperature of the power source and a position of the accelerator pedal.

12. The method of claim 8, further comprising inhibiting engine shutdown when the engine is on and the driver demand for power exceeds a respective buffer value for the determined power source temperature.

13. The method of claim 8, further comprising allowing the engine to be shut down when the driver demand for power is less than a respective buffer value for the determined power source temperature.

14. The method of claim 8, further comprising:

determining a usage factor based on power source usage; and applying the usage factor to the discharge limits to increase the discharge limits.

* * * * *